June 25, 1968  R. H. DIJKEN ET AL  3,390,289
MINIATURE ELECTRIC MOTOR ASSEMBLY
Filed Nov. 19, 1965  2 Sheets-Sheet 1

INVENTORS
REINDER H. DIJKEN
JOLLE JAGER
MINNE KRIKKE
BY
Frank R. Trifari
AGENT

June 25, 1968  R. H. DIJKEN ET AL  3,390,289
MINIATURE ELECTRIC MOTOR ASSEMBLY
Filed Nov. 19, 1965  2 Sheets-Sheet 2
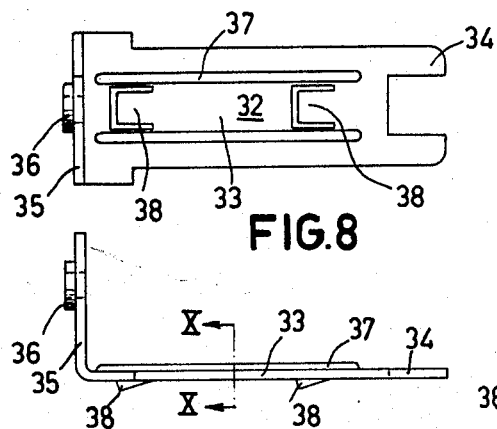
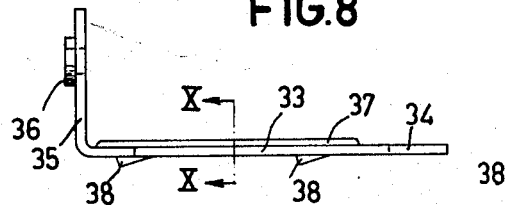
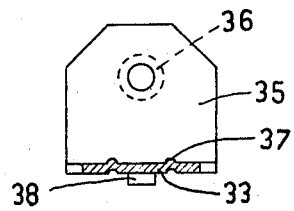
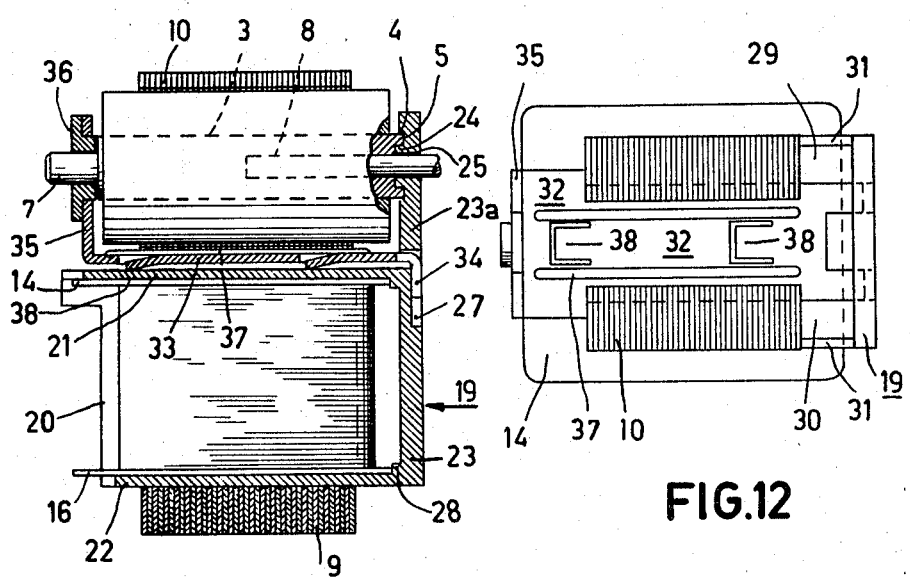
INVENTORS
REINDER H. DIJKEN
JOLLE JAGER
MINNE KRIKKE
BY
AGENT 3,390,289
MINIATURE ELECTRIC MOTOR ASSEMBLY
Reinder Hendrik Dijken, Jolle Jager, and Minne Krikke, Drachten, Netherlands, assignors to North American Philips Company, Inc., New York, N.Y., a corporation of Delaware
Filed Nov. 19, 1965, Ser. No. 508,813
Claims priority, application Netherlands, Dec. 16, 1964, 6414624
5 Claims. (Cl. 310—42)

The invention relates to a small electric motor, preferably a synchronous motor, comprising a permanent magnetic rotor, and a U-shaped stator with stator coils.

Such motors are usually manufactured in large numbers and assembly of various parts should be as simple as possible so that it can be carried out in a minimum of time and be performed by unskilled labor.

Screwed or riveted joints should be avoided as much as possible, since such connections are comparatively expensive. Also, the parts of the motor must be capable of mass production tolerances so that it is not necessary to remove material during the assembly operation in order to obtain a satisfactory fitting of parts.

The motor according to the invention fulfills said requirements completely andt is characterized in that the rotor is assembled with the stator by sliding two configured parts together on the stator for mounting the rotor on these parts.

The above and other features, objects and advantages of the present invention will be fully understood from the following description considered in connection with the accompanying illustrative drawings.

FIG. 8 is a plan view of a second sliding member.

FIG. 9 is a side elevation of the sliding member of FIG. 8.

FIG. 10 is a sectional view of the sliding member of FIG. 9 taken on the line X—X in the direction of the arrow.

FIG. 11 is a cross sectional view of a small electric motor comprising the parts shown in FIGS. 1 to 10, and fiinally FIG. 12 is a plan view of the motor of FIG. 11, the rotor being omitted.

Figure 1:
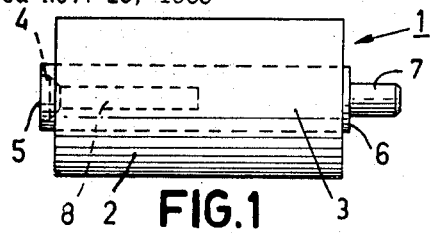
FIG. 1 is a side elevation of a permanent magnetic rotor with a shaft for use in a small electric motor.

Referring to FIG. 1, reference numeral 1 designates a rotor consisting of a sheath 2 of permanent magnetic, preferably sintered, oxidic, ferromagnetic material, for example, Magnadur. This sheath 2 is provided with a core 3 of nylon, which has on one side a collar 4, enclosing a recess 5, and on the other side a collar 6 accommodating a shaft 7. On the side of the collar 4, the core 3 is provided with an aperture 8, through which a shaft (not shown) can be passed, which may be fixed relative to the rotor by means of a flat side.

Figure 2:
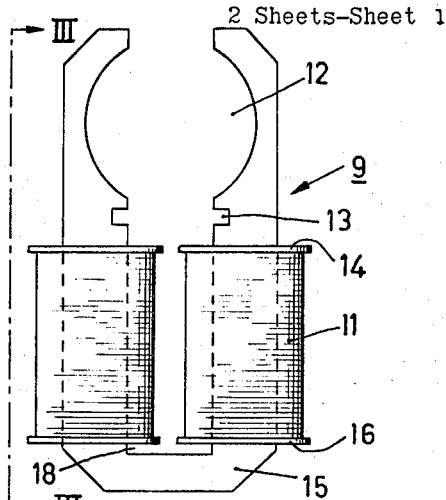
FIG. 2 is a side elevation of a laminated stator for use in a small motor, in which the rotor of FIG. 1 fits.
Figure 4:
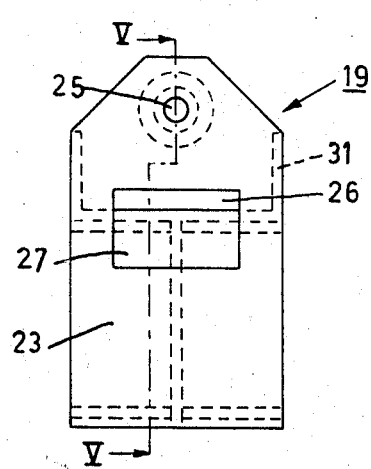
FIG. 4 is a side elevation of a sliding member.
Figure 5:
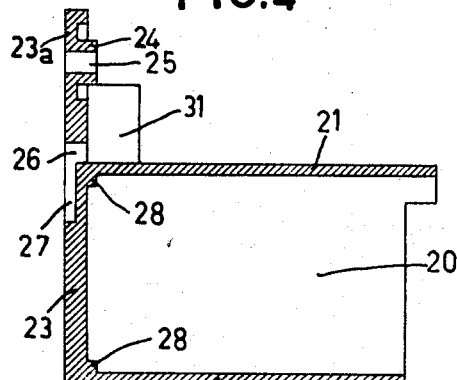
FIG. 5 is a sectional view of the sliding member of FIG. 4 taken on the line V—V in the direction of the arrow.
Figure 3:
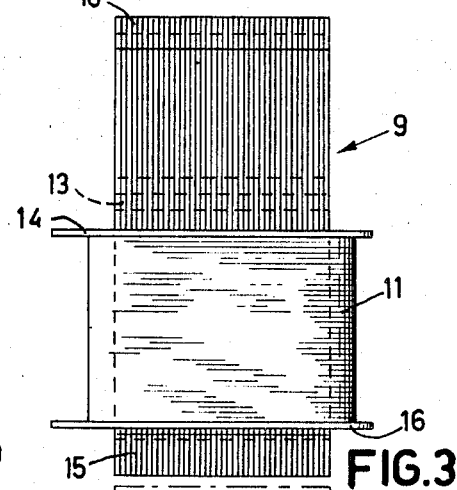
FIG. 3 is an elecation of the stator shown in FIG. 2 in the direction of the arrow.

FIGS. 2 and 3 show a U-shaped stator 9 composed of laminations 10. Two stator coils 11 are slipped onto said stator limbs. The bipolar stator has a curved cavity 12 in each limb within which the rotor 1 is adapted to rotate with a small gap or clearance. The two limbs have a groove 13 located just above flanges 14 of the coils 12. It should be noted that a space or groove 18 is left between a connecting piece 15 of stator 9 and the lower flanges 16 of stator coils 17.

FIGS. 4, 5, 6 and 7 show a first sliding member 19, which consists basically of an I-section beam, having a web 20 and two flanges 21 and 22 and a front plate 23. The front plate 23 has an upstanding arm 23a having a collar 24 with an aperture 25. The collar 24 fits with a small amount of play in the rotor recess 5 and the diameter of the aperture 25 is equal to the diameter of the aperture 8 in the rotor, so that a shaft inserted into the aperture 8 is journalled in the aperture 25.

The front plate 23 has furthermore a rectangular aperture 26, which extends through the plate 23 and which communicates with a recess 27 provided only in the front face of the plate 23.

Where the flanges 21 and 22 join the front plate 23 small lateral beams 28 are provided.

Figure 7:
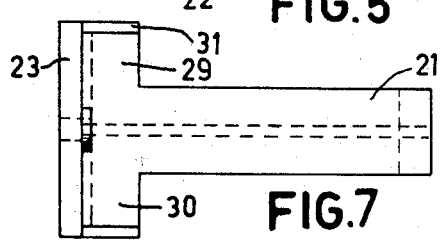
FIG. 7 is a plan view of said sliding member.
Figure 6:
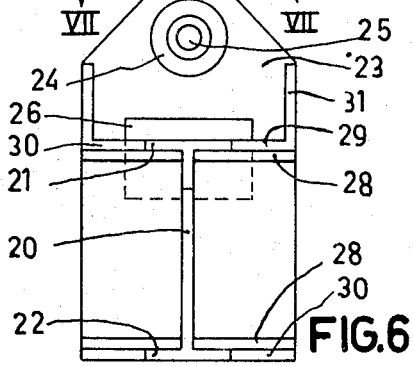
FIG. 6 is a rear viem of the sliding member of FIG. 4.

As best seen in FIGS. 6 and 7, the flanges 21 and 22 are widened at their ends adjacent the front plate 23 at 29 and 30. The upper flange 21 has, in addition to this widened part, a pair of upstanding partitions 31. The member 19 is made from molded nylon.

A second complementary sliding member 32, shown in FIGS. 8, 9 and 10, comprises a flange 33, which terminates in a fork 34. An arm 35, at right angles to the flange 33, is provided with a bearing 36 of bronze or nylon, for accommodating the shaft 7 of the rotor 1. The flange 33 has, on its upper side, two longitudinal ridges 37, and on the lower side, two protruding tags 38, which are pressed from the body of the flange 33. This member 32 is made of metal.

FIGS. 11 and 12 show the motor assembly with the parts described above. FIG. 11 is a longitudinal sectional view and FIG. 12 a top plan view which, for the sake of clarity, the rotor is omitted.

The motor is assembled as follows: After the laminations 10 of the stator 9 have been stacked, the stator coils 11 are first slipped onto the stator limbs. Then the member 19 is inserted into groove 18 and between the stator limbs so that the flange 21 is located above the coil flanges 14 and the lower flange 22 is located between the lower flange 16 of the coil 11 and the connection piece 15 of the stator. The web 20 is placed between the coils, therefore the distance between flanges 21 and 22 or the height of web 20 should be equal to the height of the stator coils 11 including the flanges. The width of the flanges 21 and 22 is equal to the distance between the stator limbs.

The rotor 1 is then mounted by arranging the recess 5 around the collar 4; then the second sliding member 32 is inserted into grooves 13 from the other side of the stator. Frst the shaft 7 of the rotor 1 slips into the bearing 36, so that the rotor is fixed in place, the slightly resilient tags 38 bear on the upper flange 21 of the first sliding member 19, so that the lower flange 22 bears on the connecting piece 15 of the stator and the stator coils 11 are fixed in place. After the complete insertion of the second sliding member 32, the fork 34 projects from the groove 26 of the first sliding member, and the tines are bent over, so that they are urged into the recess 27. The mounting operation for the motor is thus finished.

The first sliding member 19 can be inserted only until the partitions 31 and the plates 29 and 30 engage one side of the stator stack; the limb 33 of the second sliding member is widened adjacent the arm 35 and the widened part engages the stator stack at the other side, so that the stator stack is clamped when the tines of fork 34 have been bent over.

The coil flanges 14 and 16 abut the beams 28 of the first sliding member 19 so that a lateral movement of the coils is also avoided.

The first and the second sliding members need not be interconnected, by a fork 34; use may be made of a screw or rivet joint, but the connection described is inexpensive and sufficient.

Instead of using tags 38, a spring, for example, a curved leaf spring may be arranged between the sliding members, or else the tags 38 may be formed by leaf spring riveted to the flange 33.

In the embodiment described above, the stator coils are fixed by the sliding members, but if desired, the coils may be fixed to the stator in a different manner, for example by inserting small wedges.

In the embodiment described, however, a simple and quite sufficient placement of said coils is obtained.

From the foregoing, it will be obvious that with the common tolerances observed in mass production of motor parts this method of mounting does not give rise to assembly difficulty and may be carried out by unskilled labor, while the need for auxiliary tools is restricted to a device for clamping the two sliding members together while fork 34 is bent over.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. A motor assembly comprising a U-shaped stator having a connecting piece and a pair of limb pieces, stator coil means surrounding the lower portion of the limbs of said stator, rotor means, a first and a second member each having an arm for rotatably receiving said rotor means, said first and second members being adapted for slidably entering between the limbs of said stator adjacent said stator coils from opposite sides of said stator, and means for locking said members together for assembling said rotor and stator in operative relation.

2. A motor assembly according to claim 1 wherein each said member has a configured flange portion of T shape wherein the cross bar of said T is adjacent and normal with the arm of each member and defines a stop for engaging said stator whereby said members are located relative to said stator.

3. A motor according to claim 2 wherein one of said members has a web portion depending from said flange, the web of said member being located between the stator coils and the flanges of each said member being juxtaposed in assembled relation with said stator.

4. A motor according to claim 2 wherein one of said members has an I beam cross-section including a pair of said configured flanges, said stator coils being enclosed between said flanges and separated by the web of said beam; the upper flange of said one said member and the flange of the other said member being juxtaposed in assembled relation with said stator.

5. A motor according to claim 4 wherein said means for locking said members together includes a slot in the limbs of said stator adapted to receive said other member, resilient means interposed between said juxtaposed flanges for urging said one member into abutment with the connecting piece of said U-shaped stator, for locking said members relative to said stator, said other member having tines at its end remote from the associated arm, said other member having an aperture in said associated arm for receiving said tines, said tines being adapted to be bent over into the plane of the arm of said other member for axially locking said members.

References Cited
UNITED STATES PATENTS 1,216,002 2/1917 Shea _____ 310—152 X
3,135,887 6/1964 Schaffan _____ 310—154

MILTON O. HIRSHFIELD, *Primary Examiner.*

W. E. RAY, *Examiner.*